(12) United States Patent
Alexandru et al.

(10) Patent No.: US 9,923,713 B2
(45) Date of Patent: *Mar. 20, 2018

(54) DENIAL-OF-SERVICE ATTACK PROTECTION FOR A COMMUNICATION DEVICE

(71) Applicant: FREESCALE SEMICONDUCTOR, INC., Austin, TX (US)

(72) Inventors: Georgel Bogdan Alexandru, Bucharest (RO); Razvan-Tudor Stanescu, Bucharest (RO)

(73) Assignee: NXP USA, Inc., Austin, TX (US)

( * ) Notice: Subject to any disclaimer, the term of this patent is extended or adjusted under 35 U.S.C. 154(b) by 45 days.

This patent is subject to a terminal disclaimer.

(21) Appl. No.: 14/953,133

(22) Filed: Nov. 27, 2015

(65) Prior Publication Data

US 2017/0093561 A1    Mar. 30, 2017

(30) Foreign Application Priority Data

Sep. 25, 2015 (RO) .................................. 2015-0694

(51) Int. Cl.
*H04L 9/00* (2006.01)
*H04L 9/14* (2006.01)
*G06F 13/10* (2006.01)
*H04L 9/32* (2006.01)

(52) U.S. Cl.
CPC ............ *H04L 9/002* (2013.01); *G06F 13/102* (2013.01); *H04L 9/14* (2013.01); *H04L 9/3242* (2013.01); *H04L 2209/24* (2013.01)

(58) Field of Classification Search
CPC ......... H04L 9/002; H04L 9/14; H04L 9/3242; G06F 13/102
See application file for complete search history.

(56) References Cited

U.S. PATENT DOCUMENTS

| 7,907,900 | B2 | 3/2011 | Amendola |
| 2007/0206546 | A1 | 9/2007 | Alberth, Jr. et al. |
| 2013/0010960 | A1 | 1/2013 | Ho et al. |
| 2013/0259230 | A1* | 10/2013 | Polo ..................... H04L 63/0272 380/270 |
| 2014/0105396 | A1 | 4/2014 | Engelien-Lopes |
| 2017/0093856 | A1 | 3/2017 | Alexandru et al. |

FOREIGN PATENT DOCUMENTS

EP    2608478 A1    6/2013

OTHER PUBLICATIONS

Non-Final Office Action dated May 18, 2017 for U.S. Appl. No. 14/953,143, 11 pages.

* cited by examiner

*Primary Examiner* — Beemnet Dada (57) ABSTRACT

A peripheral and central device in a wireless network, such as a Bluetooth Low Energy network, may maintain privacy while connecting. During connecting energy in the peripheral device may be saved by linking an advertised address of the peripheral device to a resolvable private address of the central device, thereby providing an early indication if the central device is, according to the peripheral device, allowed to connect to the peripheral device. Hence a peripheral device performing such linking may have an improved resistance to a denial-of-service attack.

20 Claims, 9 Drawing Sheets

DENIAL-OF-SERVICE ATTACK PROTECTION FOR A COMMUNICATION DEVICE

CROSS REFERENCE TO RELATED APPLICATION(S)

The present application claims priority to Romanian Patent Application No. RO A 2015 00694, entitled "DENIAL-OF-SERVICE ATTACK PROTECTION FOR A COMMUNICATION DEVICE," filed on Sep. 25, 2015, the entirety of which is herein incorporated by reference. The present application is also related to co-pending U.S. application Ser. No. 14/953,143, entitled "COMMUNICATION DEVICE IDENTIFICATION," filed on Nov. 27, 2017.

FIELD OF THE INVENTION

The invention relates to the field of communication and specifically to setting up communication between a central device and a peripheral device.

BACKGROUND OF THE INVENTION

Denial-of-service attacks are a known problem in communication, in particular in wireless communication. Rogue devices will try to request a huge amount of services from one or more other devices to prevent normal communication between other devices. One implementation of a denial-of-service attack for a rogue device is to repeatedly set up communication with another device.

A communication capable device may be powered by a limited source of energy, such as a battery or an energy harvesting source of energy. Transmission and reception for communication may use significant amounts of energy. Hence a denial-of-service attack may drain the limited source of energy.

An example of a communication standard is the Bluetooth Low Energy (BLE) standard. A rogue central device performing a denial-of-service attack may attempt to set up communication with each or a specific peripheral device advertising its presence with an advertising address message. The rogue central device may even stall communication with keep alive messages according to the BLE standard.

A way of preventing communication with a rogue device is to recognize an address of the rogue device and to ignore further communication of the rogue device based on address selection. A disadvantage is that the rogue device may change its address, thereby preventing address selection.

BRIEF DESCRIPTION OF THE DRAWINGS

The invention will become apparent from and elucidated further with reference to the embodiments described by way of example in the following description and with reference to the accompanying drawings, in which.

The figures are schematic and not drawn to scale. In the Figures, elements which correspond to elements already described may have the same reference numerals.

DETAILED DESCRIPTION OF EXEMPLARY EMBODIMENTS

In embodiments of the invention, a denial-of-service attack during communication set-up demands significantly less processing time of the peripheral device, allowing the peripheral device to perform other services or to set up communication with another central device. And if the peripheral device is powered by a limited energy source, the denial-of-service attack drains significantly less energy from the limited energy source of the peripheral device.

The peripheral device according to embodiments of the present invention provides a challenge to the central device for an early detection of a trusted central device. If the challenge is not solved by the central device, the peripheral device may ignore the central device or may even conclude it is subjected to a denial-of-service attack during communication.

The invention will be explained with reference to wireless networks and devices, in particular networks complying with the Bluetooth Low Energy (BLE) standard. However, the invention is not so limited and may also be applied in wireless networks which fail to comply with the Bluetooth Low Energy standard, or in wired networks.

Figure 1:
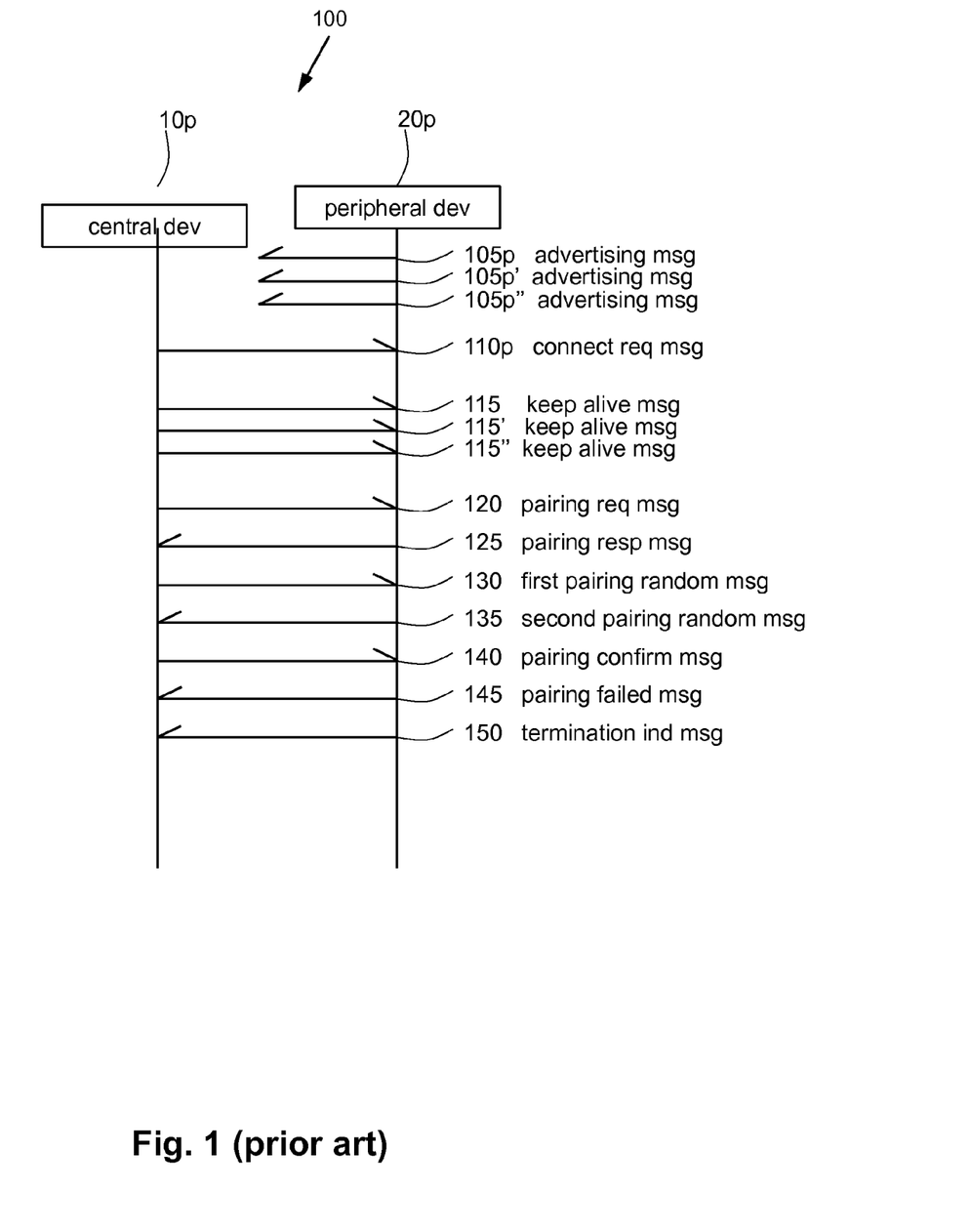
FIG. 1 schematically shows a sequence diagram of a central device according to the prior art and a peripheral device according to the prior art.

FIG. 1 schematically shows a sequence diagram 100 of a central device 10p according to the prior art and a peripheral device 20p according to the prior art. The sequence of FIG. 1 shows an attempt to set up a connection according to the prior art. In a sequence diagram, time progresses from top to bottom.

The peripheral device advertises its presence to its surroundings by transmitting advertising messages 105p, 105p', 105p". An advertising message includes an advertising address identifying the peripheral device.

The central device may pick up an advertising message of the peripheral device. In case the central device picks up the advertising message, the central device may decide to respond with a connection request message 110p to the peripheral device. The connection request message may include a resolvable private address (RPA).

The central device may keep the connection set-up alive by transmitting one or more keep-alive packets 115, 115', 115" to the peripheral device. These packets may delay the connection set-up and require the peripheral device to keep its receiver on for receiving packets from the central device.

The central device may continue with the transmission of a pairing request message 120. The pairing request message may be part of the security management protocol of the BLE standard. The pairing request message may be a first message of a sequence of messages enabling the central device and the peripheral device to share some kind of secret information. The secret information shared between the central device and the peripheral device may be used to identify the other device during a subsequent connection set-up.

The peripheral device may respond to the pairing request message by transmitting a pairing response message 125 to the central device. The central device may respond to the pairing response message by transmitting a first pairing random message 130 to the peripheral device. The first pairing random message may include a challenge for the peripheral device. If the peripheral device is able to solve this challenge, then the central device may consider this peripheral device a trusted peripheral device. The peripheral device may respond to the first pairing random message by transmitting a second pairing random message 135 to the central device. The second pairing random message may include a challenge for the central device. If the central device is able to solve this challenge, then the peripheral device may consider the central device a trusted central device.

The second pairing random message may also include the response to the challenge from the first pairing random message. The response may also be conveyed from the peripheral device to the central device in a separate message.

In case the central device accepts the response of the peripheral device to the challenge provided in the first pairing random message, the central device may transmit a pairing confirm message 140 to the peripheral device. The central device may confirm to the peripheral device in the pairing confirm message that the response provided by the peripheral device is accepted.

The pairing confirm message may also include the response to the challenge from the second pairing random message. The response may also be conveyed from the central device to the peripheral device in a separate message.

In case the peripheral device does not accept the response of the central device of the challenge provided in the second pairing random message, the peripheral device may transmit a pairing failed message 145 to the central device. The peripheral device may confirm to the central device in the pairing failed message that the response provided by the central device is not accepted.

In case of failure of the pairing, the peripheral device may transmit a termination connection message 150 to the central device terminating the connection. The connection set-up between the central device and the peripheral device will be terminated.

Figure 2:
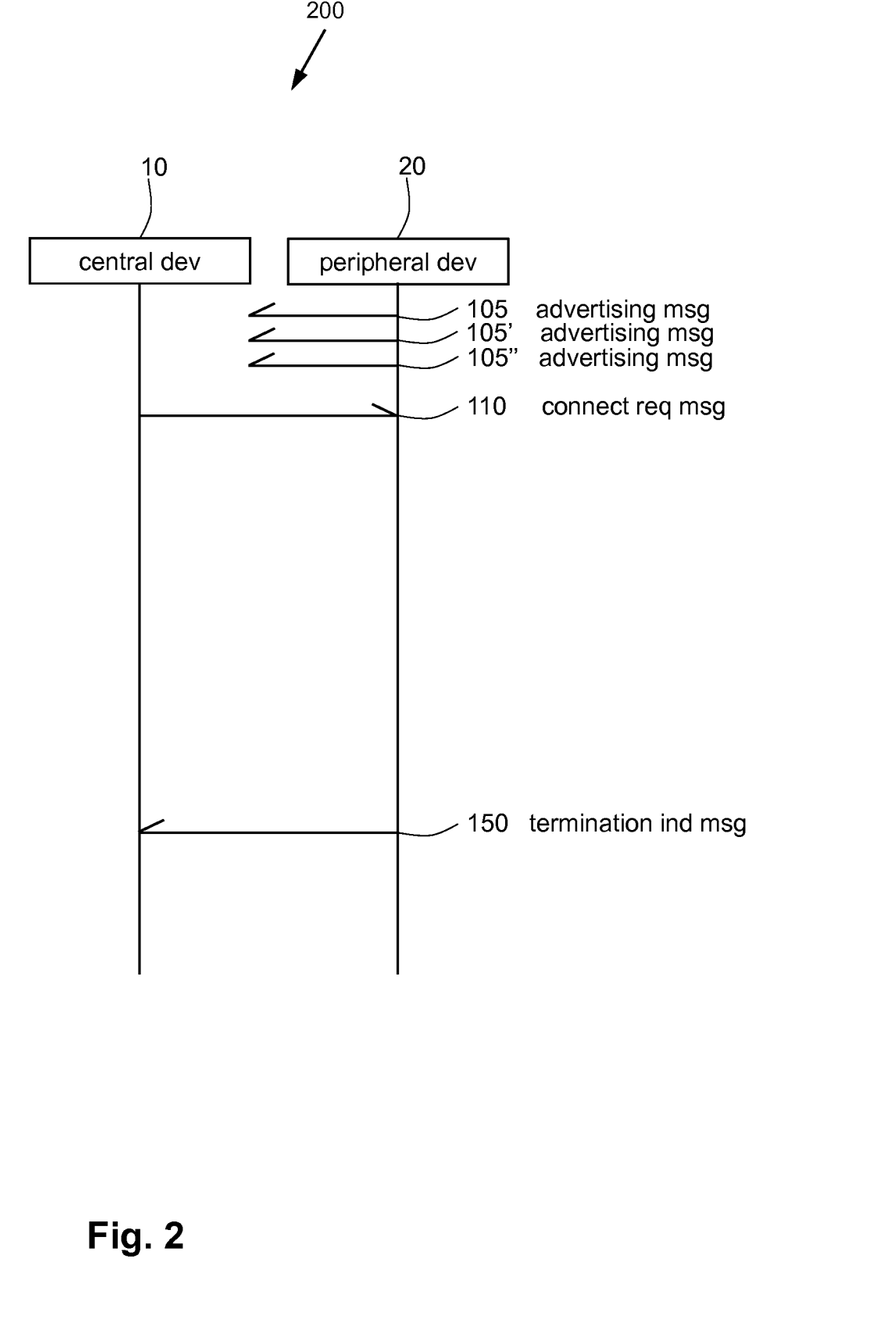
FIG. 2 schematically shows a sequence diagram of a central device and a peripheral device according to an embodiment.

FIG. 2 schematically shows a sequence diagram 200 of a central device 10 and a peripheral device 20 according to an embodiment. The sequence of FIG. 2 shows an attempt to set up a connection.

The peripheral device advertises its presence to its surroundings by transmitting advertising messages 105, 105', 105". An advertising message includes an advertising address 210 as will be described in FIGS. 5A and 5B.

Figure 5A:
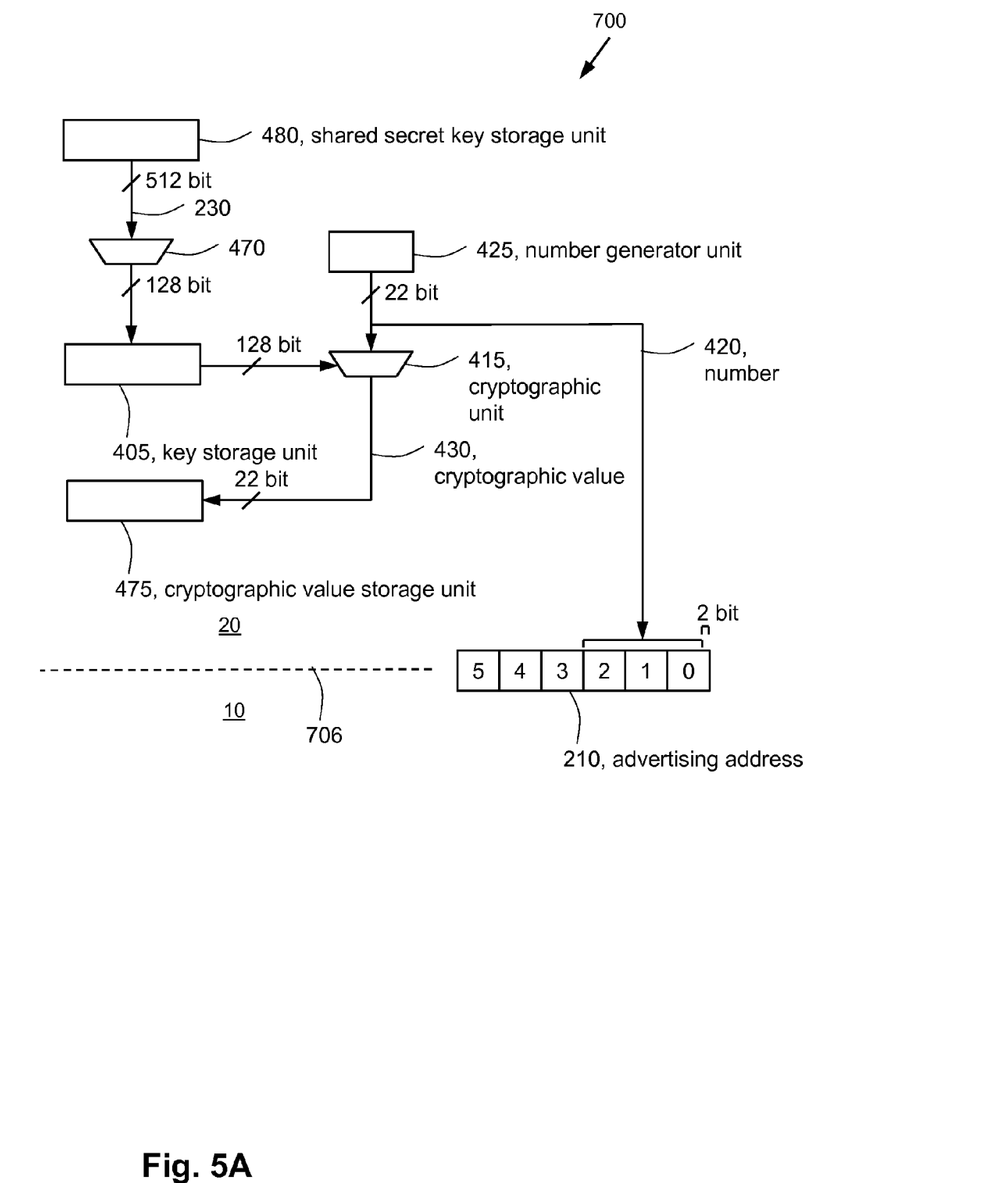
FIG. 5A, 5B, 5C show an information flow between two devices according to an embodiment.

The peripheral device provides a peripheral device number 420 as described in FIG. 5A as part of the advertising address to the central device. The peripheral number may be seen as an early way of providing a so-called challenge from the peripheral device to the central device.

The central device may pick up the advertising message of the peripheral device. In case the central device picks up the advertising message, the central device may decide to respond with a connection request message 110 to the peripheral device. The connection request message may include an RPA 220.

Figure 5B:
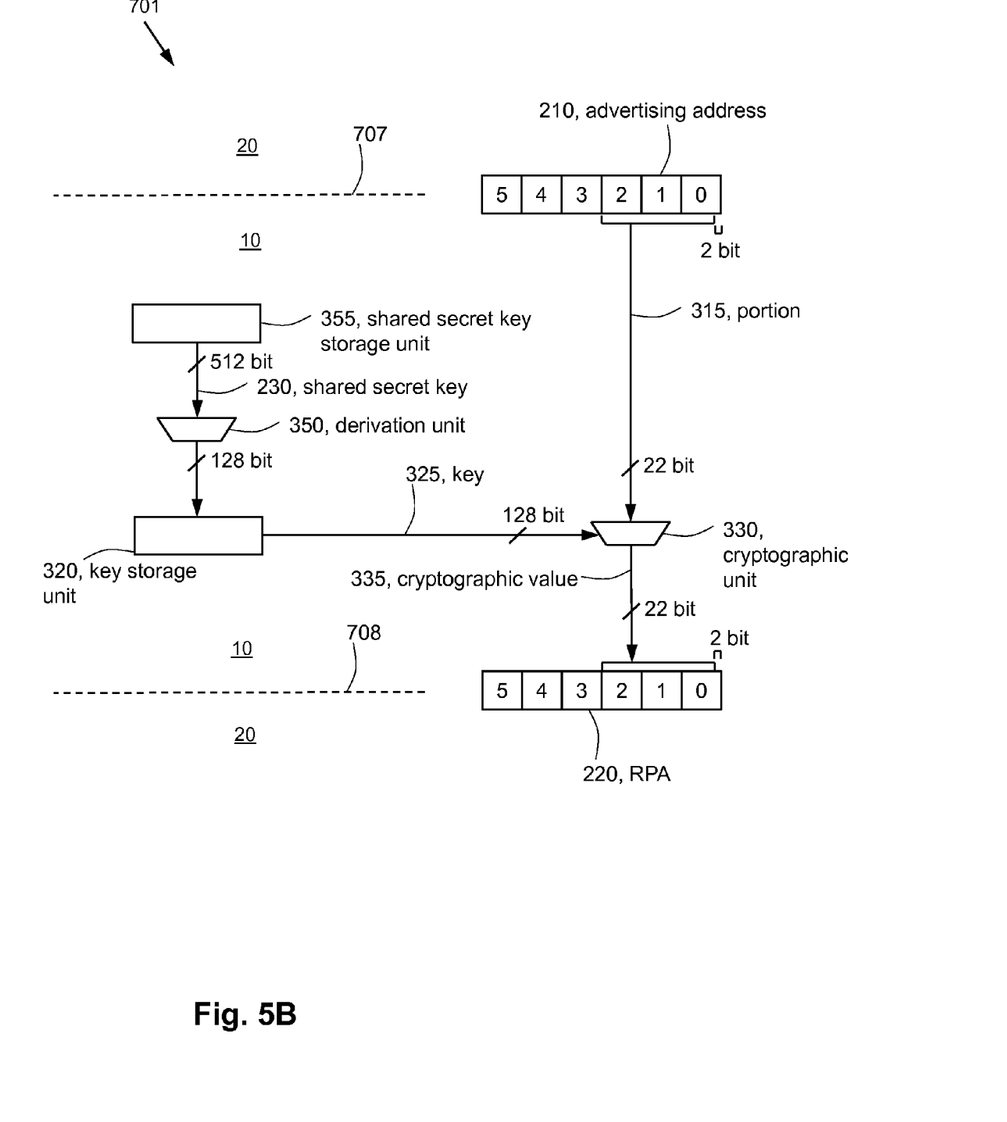
Figure 5C:
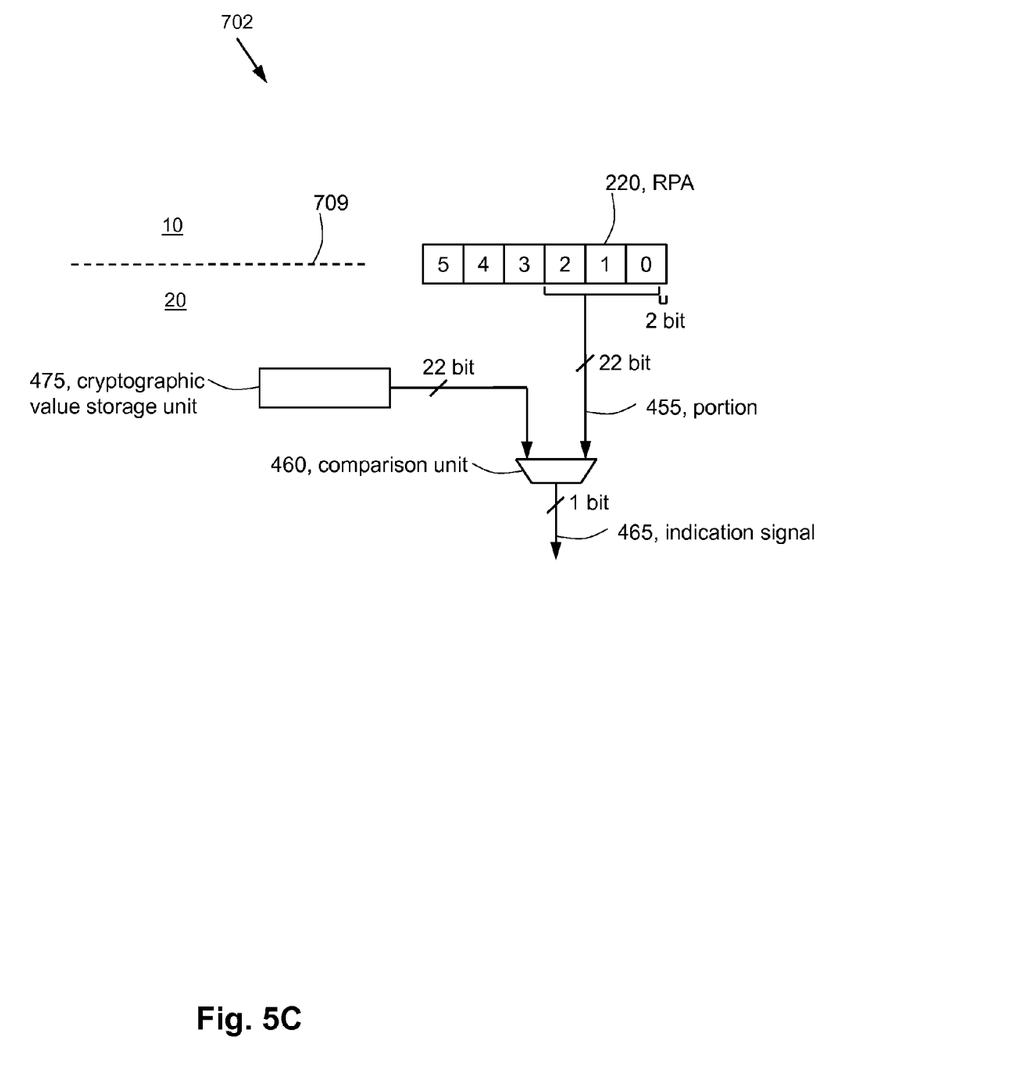

The central device provides a response to the challenge in the advertising address in the form of a central device cryptographic value 335 in FIG. 5B as part of the RPA 220 in FIGS. 5B and 5C to the peripheral device. If the central device cryptographic value does match a peripheral device cryptographic value 430 in FIGS. 5A and 5C, calculated by the peripheral device, then a positive indication is provided indicative that the central device does possess the peripheral device key. If the central device cryptographic value does not match the peripheral device cryptographic value, then a negative indication is provided indicative that the central device does not possess the peripheral device key. In this latter case the connection set-up may be early terminated, as schematically shown in the sequence of FIG. 2.

If the connection set-up is terminated early, the peripheral device may transmit a termination connection message 150 to the central device terminating the connection. The connection set-up of the central device and the peripheral device will be terminated.

If the connection set-up is terminated early, a considerable amount of transmissions or receptions of messages is saved in comparison to the prior art. The saving allows the peripheral device to decrease its vulnerability to a denial-of-service attack. The saving also allows the peripheral device to decrease the energy used for a failed communication set-up, which is especially advantageous is the peripheral device uses a limited energy source.

As can be seen from FIG. 1, in case the central device key and the peripheral device key are not the same key, according to prior art devices at least eight messages 105p, 110p, 120, 125, 130, 135, 140, 145 may be exchanged. As can be seen from FIG. 2, these at least eight messages may be reduced to at least three messages 105, 110, 150 by an implementation of an early challenge in an advertising address and an early response in an RPA. Not transmitting or receiving five messages saves energy and processing time of the peripheral device and the central device. In addition, any connection set-up attempts by rogue devices are terminated much earlier than in the prior art.

Figure 3:
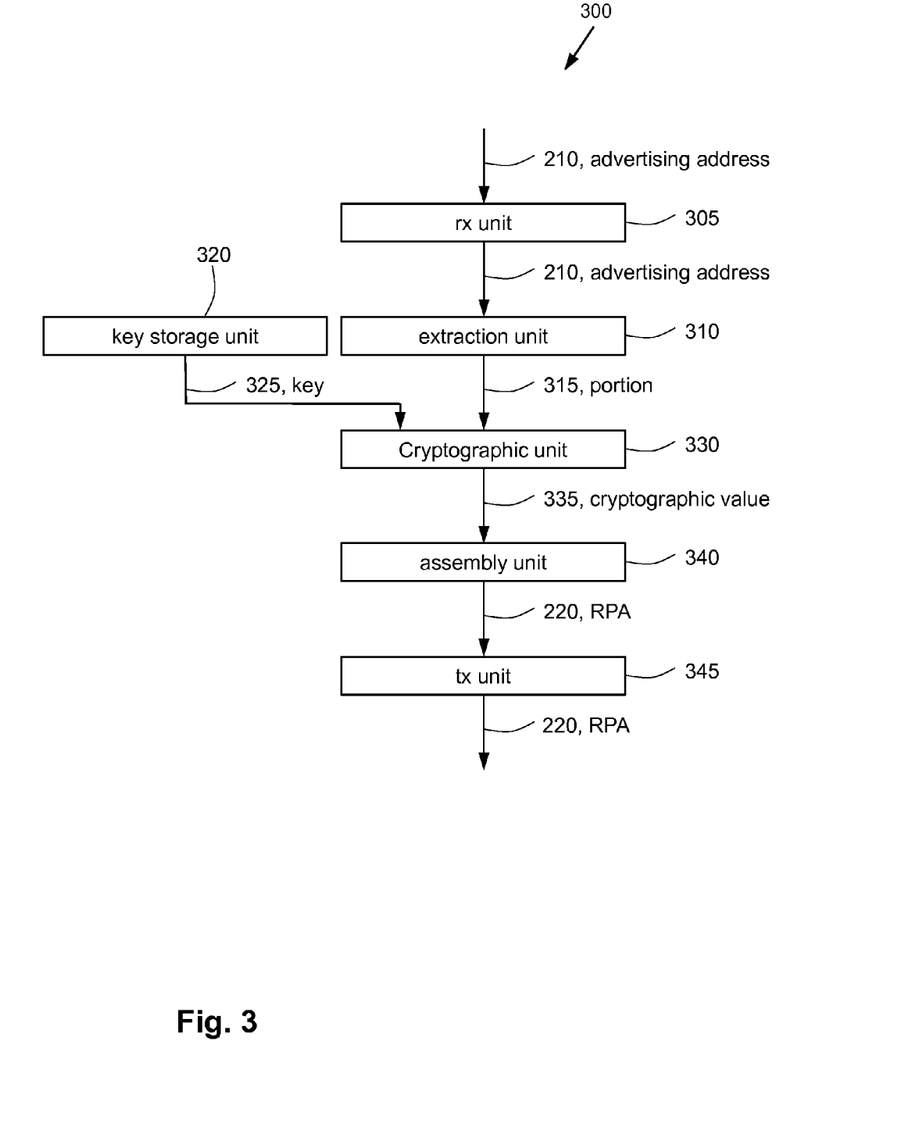
FIG. 3 schematically shows a block diagram of an embodiment of a central device.

FIG. 3 schematically shows a block diagram of an embodiment of a central device 300. The central device includes a central device receiver unit 305, a central device extraction unit 310, a central device key storage unit 320, a central device cryptographic unit, a central device assembly unit 340 and a central device transmission unit 345.

The central device receiver unit receives an advertising address 210. The advertising address may be part of a larger message received by the central device receiver unit. The advertising address is transmitted by a peripheral device, preferably according to an embodiment of a peripheral device according to the invention, such as an embodiment of a peripheral device schematically shown in FIG. 4. The advertising address may include one or more bits. In one embodiment the advertising address has a length of 48 bits.

The central device reception unit provides the received advertising address to the central device extraction unit. The central device extraction unit extracts a central device portion 315 from the advertising address. The central device portion may include one or more bits. In one embodiment the central device portion has a length of 24 or 22 bits.

The central device key storage unit stores a central device key 325. The central device key may be stored in the key storage unit during a previous communication between the central device and a peripheral device. The central device key may also be stored in the key storage unit during manufacturing, post-manufacturing or installation, or via further communication means such as a USB port, Ethernet port, wireless communication, which communication is different from the communication between the central device and a peripheral device. The central device key may also be stored in the key storage unit by deriving the central device key from a further key.

The central device key storage unit provides the central device key to the cryptographic unit. The central device extraction unit provides the central device portion to the central device cryptographic unit. The central device cryptographic unit cryptographically processes the central device portion and the central device key to obtain a central device cryptographic value 335. The central device cryptographic unit may include a keyed hash function, the central device portion being hashed in dependence of the value of the central device key. It will be understood that a keyed hash function is only an exemplary embodiment of a cryptographic processing function and that other cryptographic processing functions may be used instead.

The central device cryptographic unit provides the central device cryptographic value to the central device assembly unit. The central device assembly unit assembles a resolvable private address (RPA) 220 from at least the central device cryptographic value. The resolvable private address may include one or more bits. In one embodiment the resolvable private address has a length of 48 bits. Assembling may be concatenating, interleaving or another way of combining the central device cryptographic value with another value. The other value may be static or dynamic over time.

The central device assembly unit provides the resolvable private address to the central device transmission unit. The central device transmission unit transmits the resolvable private address to a peripheral device, preferably according to an embodiment of a peripheral device according to the invention, such as an embodiment of a peripheral device schematically shown in FIG. 4.

Figure 4:
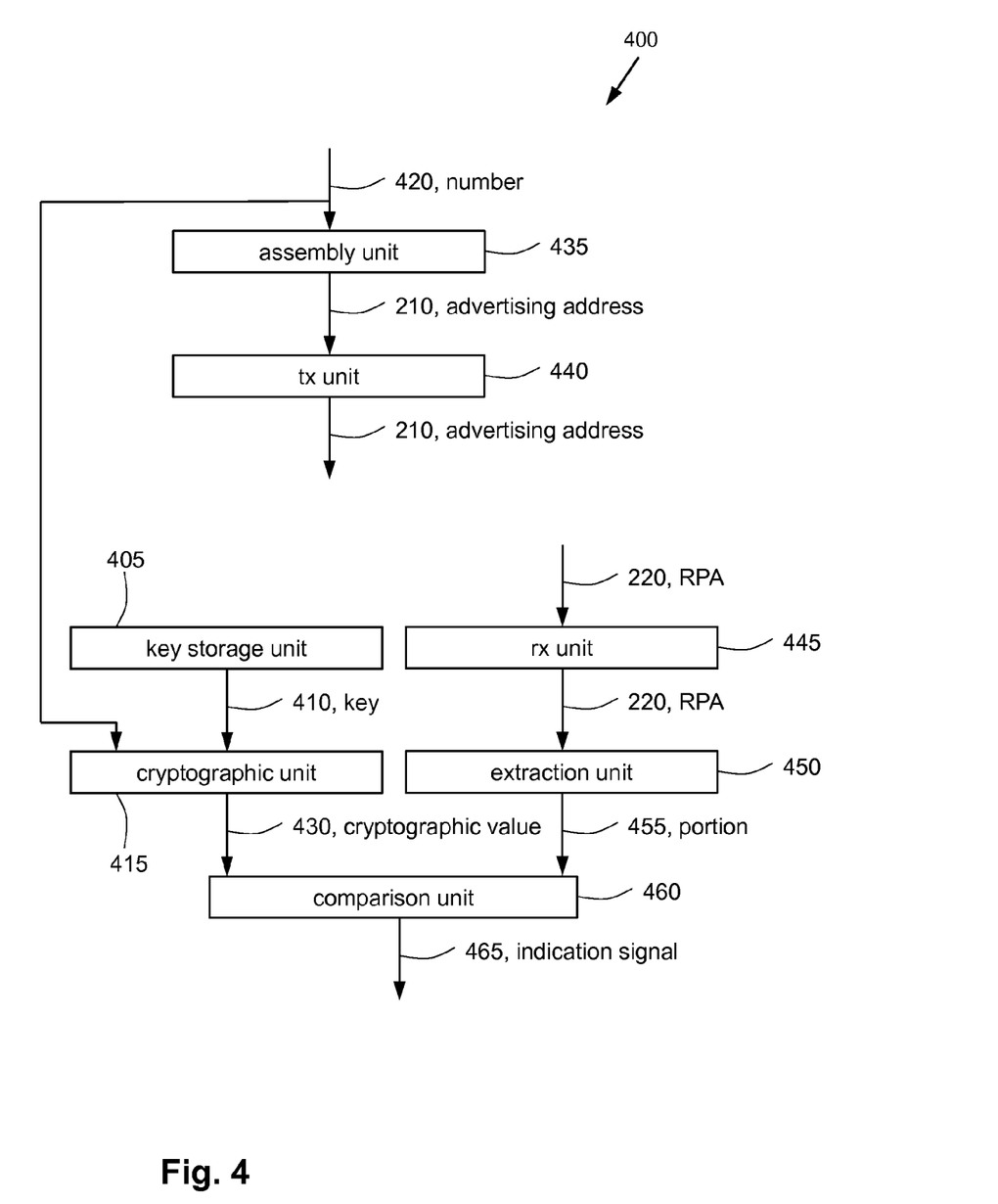
FIG. 4 schematically shows a block diagram of an embodiment of a peripheral device.

FIG. 4 schematically shows a block diagram of an embodiment of a peripheral device 400. The peripheral device includes a peripheral device assembly unit 435, a peripheral device transmission unit 440, a peripheral device key storage unit 405, a peripheral device cryptographic unit 415, a peripheral device reception unit 445, a peripheral device extraction unit 450 and a peripheral device comparison unit 460.

The peripheral device assembly unit is provided with a peripheral device number 420 to assemble an advertising address 210 from at least the peripheral device number. The advertising address may include one or more bits. In one embodiment the advertising address has a length of 48 bits. Assembling may be concatenating, interleaving or other way of combining of the peripheral device advertising with another value. The other value may be static or dynamic over time.

The peripheral device assembly unit provides the advertising address to the peripheral device transmission unit 440. The peripheral device transmission unit transmits the advertising address to a central device, preferably according to an embodiment of a central device according to the invention, such as an embodiment of a central device schematically shown in FIG. 3.

The peripheral device key storage unit stores a peripheral device key 410. The peripheral device key may be stored in the peripheral device key storage unit during a previous communication between a central device and the peripheral device. The peripheral device key may also be stored in the peripheral device key storage unit during manufacturing, post-manufacturing or installation, or via further communication means, such as a USB port, Ethernet port, wireless communication, which communication is different from the communication between a central device and the peripheral device. The peripheral device key may also be stored in the key storage unit after deriving the peripheral device key from a further key.

The peripheral device key storage unit provides the peripheral device key to the peripheral device cryptographic unit. Further the peripheral device number 420 is provided to the peripheral device cryptographic unit. The peripheral device cryptographic unit cryptographically processes the peripheral device number and the peripheral device key to obtain a peripheral device cryptographic value 430. The peripheral device cryptographic unit may include a keyed hash function, which hashes the peripheral device number in dependence of the value of the peripheral device key.

The peripheral device receiver unit receives a resolvable private address 220. The resolvable private address may be part of a larger message received by the peripheral device receiver unit. The resolvable private address is transmitted by a central device, preferably according to an embodiment of a central device according to the invention, such as an embodiment of a central device schematically shown in FIG. 4. The private resolvable address may include one or more bits. In one embodiment the private resolvable address has a length of 48 bits.

The peripheral device reception unit provides the received private resolvable address to the peripheral device extraction unit. The peripheral device extraction unit extracts a peripheral device portion 455 from the private resolvable address. The peripheral device portion may include one or more bits. In one embodiment the peripheral device portion has a length of 24 or 22 bits.

The peripheral device cryptographic unit provides the peripheral device cryptographic value to the peripheral device comparison unit. Further the peripheral device extraction unit provides the peripheral device portion to the peripheral device comparison unit. The peripheral device comparison unit compares the peripheral device cryptographic value and the peripheral device portion.

A peripheral device indication signal 465 is provided by the peripheral device comparison unit. The peripheral device indication signal is a positive indication signal when the peripheral device comparison unit finds a match between the peripheral device cryptographic value and the peripheral device portion. The peripheral device indication signal is a negative indication signal if no match is found.

The match found by the peripheral device comparison unit may be defined as the peripheral device cryptographic value and the peripheral device portion being bitwise equal. In an embodiment of the peripheral device comparison unit, part of the peripheral device cryptographic value is masked before the comparison function.

The positive indication signal indicates that the central device does possess the peripheral device key. Hence the peripheral device key of the peripheral device and the central device key of the central device are equal. In an embodiment the peripheral device may treat the central device as a trusted device when a positive indication signal has been produced.

The negative indication signal indicates that the central device does not possess the peripheral device key. Hence the peripheral device key of the peripheral device and the central device key of the central device are not equal. In an embodiment, the peripheral device may treat the central device as an untrusted device when a negative indication signal has been produced.

FIGS. 5A, 5B and 5C schematically show an information flow between a peripheral device 20 and a central device 10. The separation between the devices is shown by dotted lines 706, 707, 708, 709.

Information crossing a dotted line in the information flow diagram is information which is communicated between the peripheral device and the central device. The information communicated from a peripheral device to a central device includes an advertising address 210. The information communicated from a central device to a peripheral device includes a resolvable private address (RPA) 220.

Although the embodiment is shown with little-endianness, the embodiments are not limited to little-endianness implementations. For endianness the information may be split in nibbles, bytes, words, double words or longs. An example of a standard using little-endianness is the Bluetooth low energy standard as specified in paragraph 5.2 part E in Bluetooth specification v4.0 [Vol 2].

FIG. 5A schematically shows the first information flow diagram 700. A start of the information flow is made with the selection of a peripheral device number 420 of 22 bits by a peripheral device number generator unit 425. The peripheral device number may be a randomly selected number. The peripheral device number may be a permanent number or a semi-permanent number. The peripheral device number may be put into the advertising address 210 as the bits directly following an address type identification of 2 bits according to the BLE standard. The advertising address has a size of 48 bits and can be transmitted from the peripheral device and can be received by a central device.

A peripheral device cryptographic unit 415 takes as input the peripheral device number and a peripheral device cryptographic key 410. A result of the peripheral device cryptographic unit is a peripheral device value 430 having a length of 22 bits. The peripheral device cryptographic key may have a size of 128 bits.

The peripheral device may include a shared secret key 230 stored in a peripheral device shared secret key storage unit 480. The shared secret key may have a size of 512 bits. The peripheral device key may be derived from the shared secret key 230 by a peripheral device derivation unit 470. The peripheral device derivation unit may include a keyed hash function. The peripheral device derivation unit may include an extraction function. The peripheral device derivation unit may include a function reducing the number of bits from 512 bits of the shared secret key to 128 bits of the peripheral device key.

In an embodiment, the peripheral device cryptographic unit includes a hash function or a keyed hash function. In an embodiment, the peripheral device cryptographic unit and the peripheral device derivation unit share circuitry implementing the keyed hash function, the hash function or the extraction function. This sharing of circuitry allows an efficient implementation and a reduction of use of die area.

The computation of the peripheral device cryptographic value may be diverted to the information flow diagram in FIG. 5C. The peripheral device cryptographic value 430 shown in the FIGS. 5A and 5C may not need a peripheral device cryptographic value storage unit as shown in the FIGS. 5A and 5C.

FIG. 5B schematically shows a second information flow diagram 701. The information flow starts with receiving the advertising address 210.

A central device cryptographic unit 330 of the central device takes as input 22 bits from the advertising address and a central device key 325, and cryptographically processes the inputs to obtain a central device cryptographic value 335 of 22 bits. The 22 bits extracted from the advertising address may be the same bits as inserted in the advertising address by the peripheral device, transmitting the advertising address.

The central device may include a shared secret key 230 stored in a central device shared secret key storage unit 355. The shared secret key may have a size of 512 bits. A central device key 325 may be derived from the shared secret key 230 by a central device derivation unit 350. The central device derivation unit may include a hash function or a keyed hash function. The central device derivation unit may include an extraction function. The central device derivation unit may include a function reducing the amount of bits from 512 bits of the central shared secret key to 128 bits of the central device key.

In an embodiment, the central device cryptographic unit includes a hash function or keyed hash function. In an embodiment the central device cryptographic unit and the central device derivation unit share circuitry implementing the hash function, keyed hash function or extraction function. This sharing of circuitry allows an efficient implementation and a reduction of use of die area.

An RPA 220 may be formed by inserting a central device cryptographic value 335 in the RPA 220. In an embodiment the RPA has a size of 48 bits. The point where the central device cryptographic value is inserted may be any point of the RPA. The bits of the central device cryptographic value may be inserted at various location in the RPA. The various locations may reveal an interleaved pattern. The central device cryptographic value may be inserted right next to the 2 most significant bits of the RPA.

The information flow in the central device results in the RPA 220 being transmitted from the central device to the peripheral device.

FIG. 5C schematically shows the third information flow diagram 702. The information flow starts with receiving the RPA 220.

An extraction is done to extract 22 bits from the RPA resulting in a peripheral device portion 455. The peripheral device portion may be constituted from the 22 bits of the RPA adjacent to the 2 most significant bits. The peripheral device portion is the same 22 bits inserted by the central device as the central device cryptographic value 335.

A peripheral device comparison unit 460 compares the peripheral device portion 455 with the peripheral device cryptographic value 430. The result of the comparison may be stored in a temporary storage.

If a match is found between the peripheral device portion and the peripheral device cryptographic value, the peripheral device provides a positive indication signal indicating that the central device has the peripheral device key and applied the same cryptographic processing. And if the positive indication signal is given, the peripheral device assumes that the central device belongs to the selected group of trusted devices. For example, the trusted device may be allowed by the peripheral device to connect to the peripheral device. The rest of the set-up of the connection may be done according to the BLE standard.

If no match is found between the peripheral device portion and the peripheral device cryptographic value, the peripheral device provides a negative indication signal indicating that the central device does not possess the peripheral device key or did not apply the same cryptographic processing. And if the negative indication is given, it further means that the central device does not belong to the selected group of trusted devices. For example, the untrusted devices may not be allowed to connect to the peripheral device. The rest of the set-up of the connection may be terminated. The peripheral device may transmit a termination message. If the peripheral device is complies with the BLE standard, the termination message may be an LL_TERMINATE_IND message. The peripheral device may also ignore further communication from the untrusted central device.

The dependency of an RPA on the advertising address makes it necessary that the central device maintains an RPA for each peripheral device connecting or connected with the central device.

The BLE standard maintains privacy during pairing with the use of the output of a hash function. This hash function is specified in paragraph 6.1 part H of Bluetooth specification v4.0 [Vol 2]. The use of the hash function is specified in paragraph 2.2.2 part H of Bluetooth specification v4.0 [Vol 3]. The hash function has a first input parameter and a second input parameter. The first parameter may be a shared secret key such as an identity resolving key (IRK) or any other type of shared secret key of arbitrary length. The second parameter may be a nonce value or a random value. An RPA may be provided according to paragraph 10.8.2.2 part C of Bluetooth specification v4.0 [Vol 3]. An RPA may have a typical size of 48 bits. An advertising address may have a typical size of 48 bits.

The hash function in this document may comply with the hash function specified in the BLE standard. Other hash functions are known to the person skilled in the art and may be used in embodiments of a central device or a peripheral device.

The hash function according to the BLE standard provides a 24 bits hash value. A further reduction of 24 bits to, for example, 22 bits may be provided by including a truncation of the highest 2 bits from the 24 bits value in the hash function.

The different boxes drawn in FIGS. 5A and 5C may be interpreted as units of a central device according to an embodiment. The different boxes drawn in FIG. 5B may be interpreted as units of a peripheral device according to an embodiment.

Figure 6:
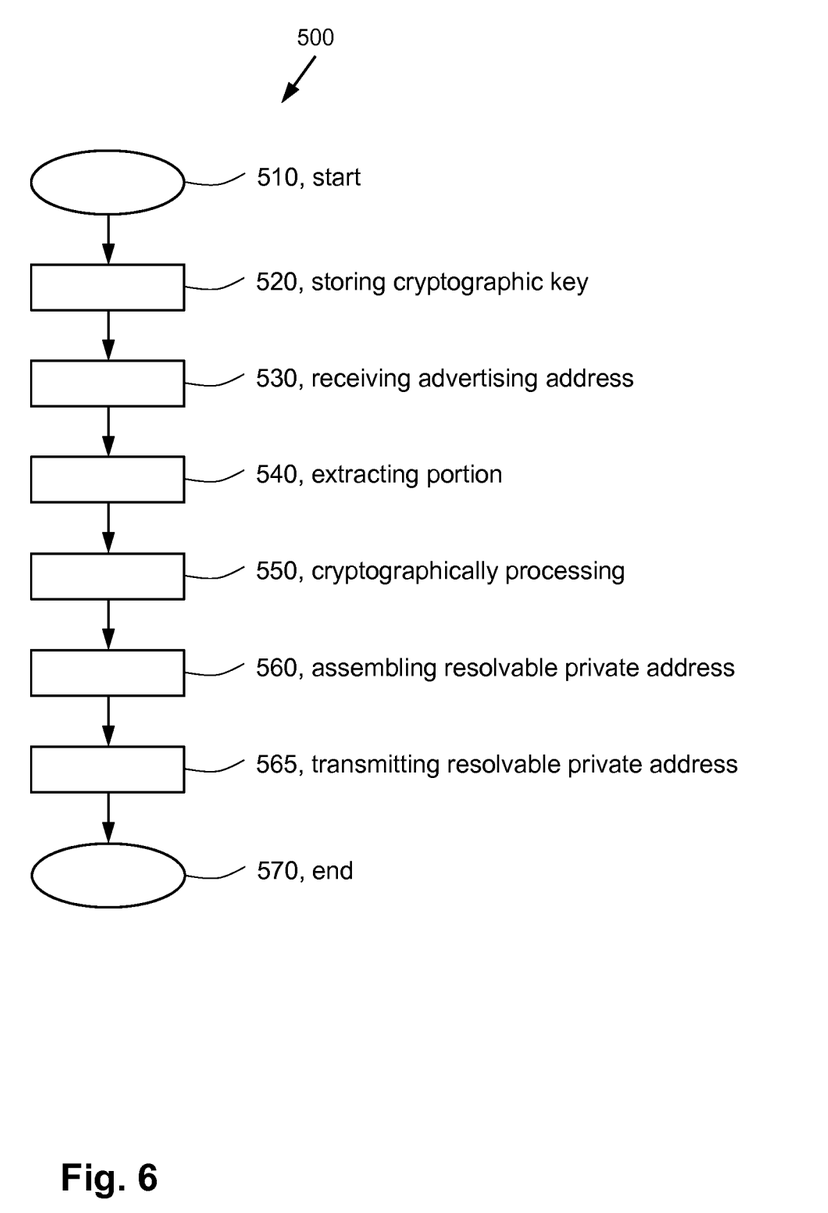
FIG. 6 schematically shows a control flow of a central device according to an embodiment.

FIG. 6 schematically shows a control flow 500 of a central device 10 according to an embodiment.

From a central device start 510 of the control flow of the central device, the control flow enters a storing central device cryptographic key state 520. After storing a central device key, the control flow continues to a receiving advertising address state 530. In the receiving advertising state the central device waits for an advertising address to be received from a peripheral device.

As soon as an advertising address is received, the control flow continues to a central device extracting portion state 540. The central device extracting portion state extracts a central device portion from the advertised address received in the receiving advertising address state.

After extracting, the control flow continues to a cryptographically processing central device key and central device portion state 550. The cryptographically processing central device key and central device portion state cryptographically processes the central device key and the central device portion to provide a central device cryptographic value.

After cryptographically processing the control flow continues to a central device assembling resolvable private address state 560. The central device assembling resolvable private address state assembles a resolvable private address from at least the central device cryptographic value. The resolvable private address is preferably used in the response message to the peripheral device.

After assembling, the control flow continues to the central device transmission state 565. The central device transmission state transmits the resolvable private address to the peripheral device, which transmitted the advertising address. After transmission, the control flow continues to the central device end state 570.

Figure 7:
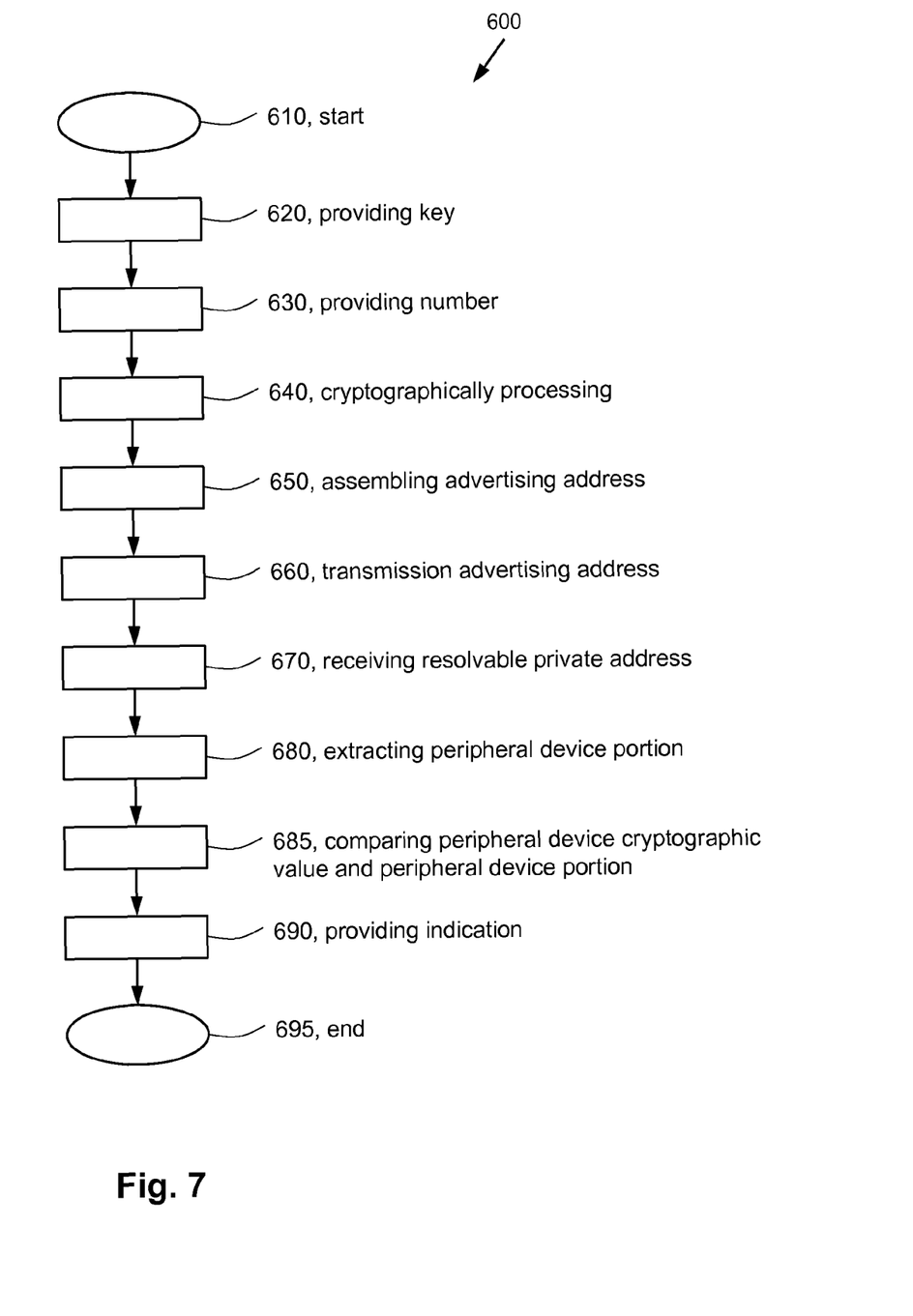
FIG. 7 schematically shows a control flow of a peripheral device according to an embodiment.

FIG. 7 schematically shows a control flow 600 of a peripheral device 20 according to an embodiment.

From a peripheral device start 610 of the control flow of the peripheral device, the control flow enters a providing peripheral device key state 620. The providing peripheral device key state provides a peripheral device key. After providing the peripheral device key, the control flow continues with a providing peripheral device number state 630, in which a peripheral device number is provided. The order of the providing peripheral device key state and the providing peripheral device number state may be interchanged without affecting the behaviour of any following states.

After providing the peripheral device number, the control flow continues with a cryptographically processing peripheral device key and peripheral device number state 640, which cryptographically processes the peripheral device key and the peripheral device number to a peripheral device cryptographic value.

After cryptographically processing, the control flow continues to obtain a peripheral device assembling advertising address state 650, which assembles the advertising address from at least the peripheral device cryptographic value. After assembling, the control flow continues with a peripheral device transmission advertising address state 660, which transmits the advertising address. As long as no reply to the transmission of the advertising address has been received, the peripheral device repeats the transmission of the advertising address. If a reply to the advertising address is received, the control flow continues to a peripheral device receiving resolvable private address state 670, which receives a resolvable private address as a reply to the advertising address.

After receiving, the control flow continues with a peripheral device extracting peripheral device portion state 680, in which a peripheral device portion is extracted from the resolvable private address. After extracting, the control flow continues with a comparing peripheral device cryptographic value and peripheral device portion state 685, in which the peripheral device cryptographic value and peripheral device portion are compared with each other.

After the comparing, the control flow continues with a peripheral device providing indication state 690, in which an indication of the result of the comparing is provided. The peripheral device providing state is followed by a peripheral device end state 695 in the central device control flow.

A key in the context of this document may be seen as a key shared by a group of devices. Hence a central device key of a central device and a peripheral device key of a peripheral device should have an equal value, allowing the two devices to set up and maintain a connection. If the central device key and the peripheral device key are derived from a further secret key, such as a shared central device secret key and a shared peripheral device secret key, and are derived with the use of a central device derivation function and a peripheral device derivation function respectively, the respective shared secret keys should hold the same value and use the same derivation functions. The group of devices may belong to a single network or may belong to multiple networks. The central device and peripheral device keys may be derived from a shared secret key, the shared secret key being shared within the group of devices. Either the key or the shared secret key may be communicated to a device of the group using out-of-band communication. Out-of-band communication may involve a proprietary message, including directly or indirectly the key or the shared secret key, to the device. Out-of-band communication may also involve, during manufacturing or installing, programming some memory, preferably non-volatile memory, more preferably a write protected memory, more preferably a write once memory, most preferably a ROM (Read Only Memory).

A storage in a central device may include a central device key or may include a central device shared secret key in combination with a derivation function for deriving the central device key from the combination.

A storage in a peripheral device may include a peripheral device key or may include a peripheral device shared secret key in combination with a derivation function for deriving the peripheral device key from the combination.

A central device shared secret or a peripheral device shared secret may have a size of 64 bytes. A central device shared secret or a peripheral device shared secret may have a size of 128 bytes. A central device shared secret or a peripheral device shared secret may have a size of 256 bytes. A central device shared secret or a peripheral device shared secret may have a size of 512 bytes.

A communication set-up method for a central device may include connecting with a peripheral device and when the connection is established, exchanging with the peripheral device a capability declaration, stating to be able to assemble the resolvable private address according to a method mentioned above. This method allows a one-time connection of the central device for exchanging capability information with a peripheral device. After this exchange if the central device is reconnecting to the same peripheral device, the central device may perform a method as mentioned above. Preferably the communication set-up method includes one or more measures for secure communication between the central device and the peripheral device.

A communication set-up method for a peripheral device may include connecting with a central device and when the connection is established, exchanging with the central device a capability declaration, stating to be able to assemble the resolvable private address according to a method mentioned above. This method allows a one-time connection of the peripheral device for exchanging capability information with a central device. After this exchange if the peripheral device is reconnecting later on to the same central device, the peripheral device may perform the method as mentioned above. Preferably the communication set-up method includes one or more measures for secure communication between the central device and the peripheral device.

A central device configured to set up communication with a peripheral device, the central device including a central device receiver unit configured to receive an advertising address from the peripheral device, a central device portion extraction unit configured to extract a central device portion from the advertising address received from the central device receiver unit, a central device key storage unit configured to store a central device key a central device cryptographic unit configured to obtain the central device key from the central device key storage unit, to obtain the central device portion from the central device portion extraction unit and to cryptographically process the central device key and the central device portion to obtain a central device cryptographic value, a central device assembly unit configured to obtain the central device cryptographic value from the central device cryptographic unit and to assemble a resolvable private address including the central device cryptographic value, and a central device transmitter unit configured to obtain the resolvable private address from the central device assembly unit and to transmit the resolvable private address.

A peripheral device may be configured to set up communication with a central device, the peripheral device including a peripheral device key storage unit configured to store a peripheral device key, a peripheral device cryptographic unit configured to obtain the peripheral device key from the peripheral device key storage unit and to cryptographically process the peripheral device key and a peripheral device number to obtain a peripheral device cryptographic value, a peripheral device assembly unit configured to assemble an advertising address including the peripheral device number, a peripheral device transmitter unit configured to transmit the advertising address, a peripheral device receiver unit configured to receive a resolvable private address from the central device, a peripheral device extraction unit configured to extract at least a portion from the resolvable private address to obtain a peripheral device portion, a peripheral device comparison unit configured to compare the peripheral device cryptographic value and the peripheral device portion, and a peripheral device indication signal configured to provide a positive indication signal when said comparing provides a match, wherein the positive indication signal indicates that the central device does possess the peripheral device key, and otherwise a negative indication signal, wherein the negative indication signal indicates that the central device does not possess the peripheral device key.

A communication set-up method for a central device may be configured for communication with a peripheral device, the method including storing a central device key, receiving an advertising address from the peripheral device, extracting a central device portion from the advertising address, cryptographically processing the central device key and the central device portion to obtain a central device cryptographic value, assembling a resolvable private address including the central device cryptographic value, and transmitting the resolvable private address.

A communication set-up method for a peripheral device may be configured for communication with a central device, the method including providing a peripheral device key, providing a peripheral device number, cryptographically processing the peripheral device key and the peripheral device number to obtain a peripheral device cryptographic value, assembling an advertising address including the peripheral device number, transmitting the advertising address, receiving a resolvable private address from the central device, extracting at least a portion from the resolvable private address to obtain a peripheral device portion, comparing the peripheral device cryptographic value and the peripheral device portion, and providing a positive peripheral device indication signal when said comparing provides a match indicating that the central device does possess the peripheral device key and providing a negative peripheral device indication signal when said comparing fails to provide a match indicating that the central device does not possess the peripheral device key.

The peripheral device may include a peripheral device number generator unit. The peripheral device number generator may generate the peripheral device number by a random or pseudo random function.

A network including at least one central device arranged for communication with a peripheral device and enabling communication set-up, wherein the central device is as specified above and the peripheral device is as specified above.

A computer program product configured for a central device including a processor, wherein the processor is arranged to operate according to a communication set-up method as specified above.

A computer program product configured for a peripheral device including a processor, wherein the processor is arranged to operate according to a communication set-up method as specified above.

A denial-of-service attack may be performed by a rogue central communication device repeatedly setting-up a communication link to a peripheral device, wherein the peripheral device repeatedly terminates the communication link set-up. Hence the peripheral device, as above described, has an improved resistance to the rogue central communication device performing the denial of service attack on the peripheral device. The improved resistance may be due to an early termination of the communication set-up, wherein the early termination may prevent an energy drain from a power source of the peripheral device as well as an excessive computation time consumption of a processor.

In the foregoing specification, the invention has been described with reference to specific examples of embodiments of the invention. It will, however, be evident that various modifications and changes may be made therein without departing from the scope of the invention as set forth in the appended claims. For example, the connections may be any type of connection suitable to transfer signals from or to the respective nodes, units or devices, for example via intermediate devices. Accordingly, unless implied or stated otherwise the connections may for example be direct connections or indirect connections.

Devices functionally forming separate devices may be integrated in a single physical device. Also, the units and circuits may be suitably combined in one or more semiconductor devices.

However, other modifications, variations and alternatives are also possible. The specifications and drawings are, accordingly, to be regarded in an illustrative rather than in a restrictive sense.

In the claims, any reference signs placed between parentheses shall not be construed as limiting the claim. The word 'comprising' or 'including' does not exclude the presence of other elements or steps than those listed in a claim or text. Furthermore, the terms "a" or "an," as used herein, are defined as one or as more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles. Unless stated otherwise, terms such as "first" and "second" are used to arbitrarily distinguish between the elements such terms describe. Thus, these terms are not necessarily intended to indicate temporal or other prioritization of such elements. The mere fact that certain measures are recited in mutually different claims does not indicate that a combination of these measures cannot be used to advantage.

The invention claimed is:

1. A central device configured to set up communication with a peripheral device, the central device comprising
    a central device receiver unit configured to receive an advertising address from the peripheral device;
    a central device portion extraction unit configured to extract a central device portion from the advertising address received from the central device receiver unit;
    a central device key storage unit configured to store a central device key;
    a central device cryptographic unit configured to cryptographically process the central device key received from the central device key storage unit and the central device portion received from the central device portion extraction unit to obtain a central device cryptographic value;
    a central device assembly unit configured to assemble a resolvable private address comprising the central device cryptographic value received from the central device cryptographic unit; and
    a central device transmitter unit configured to transmit the resolvable private address received from the central device assembly unit.

2. The central device according to claim 1, wherein at least one of the central device receiver unit and the central device transmitter unit is configured for wireless communication.

3. The central device according to claim 1, wherein the central device cryptographic unit is configured to use a keyed hash function.

4. The central device according to claim 1, wherein the communication set-up is an anonymous communication set-up or a secure communication set-up.

5. The central device according to claim 1, wherein the central device portion has a length of 22 bits, the central device cryptographic value has a length of 22 bits or the central device key has a length of 16 bytes.

6. The central device according to claim 1 comprising a central device derivation unit configured to derive the central device key from a shared secret key shared with at least the peripheral device.

7. The central device according to claim 6, wherein the shared secret key has a length of 64 bytes.

8. The central device according to claim 6, wherein the central device derivation unit is configured to derive the central device key using an MD5 or an SHA function.

9. The central device according to claim 1, wherein the central device is compliant with a Bluetooth Low Energy standard or the advertising address and the resolvable private address are compliant with the Bluetooth Low Energy standard.

10. A peripheral device configured to set up communication with a central device, the peripheral device comprising
    a peripheral device key storage unit configured to store a peripheral device key;
    a peripheral device cryptographic unit configured to cryptographically process the peripheral device key received from the peripheral device key storage unit and a peripheral device number to obtain a peripheral device cryptographic value;
    a peripheral device assembly unit configured to assemble an advertising address comprising the peripheral device number;
    a peripheral device transmitter unit configured to transmit the advertising address;
    a peripheral device receiver unit configured to receive a resolvable private address from the central device;
    a peripheral device extraction unit configured to extract at least a portion from the resolvable private address to obtain a peripheral device portion;
    a peripheral device comparison unit configured to compare the peripheral device cryptographic value and the peripheral device portion; and
    a peripheral device indication signal configured to provide a positive indication signal when said comparing provides a match, wherein the positive indication signal indicates that the central device does possess the peripheral device key, and otherwise a negative indication signal, wherein the negative indication signal indicates that the central device does not possess the peripheral device key.

11. The peripheral device according to claim 10, wherein at least one of the peripheral device receiver unit and the peripheral device transmitter unit is configured for wireless communication.

12. The peripheral device according to claim 10, wherein the peripheral device cryptographic unit is configured to use a keyed hash function.

13. The peripheral device according to claim 10, wherein said communication set-up is an anonymous communication set-up or a secure communication set-up.

14. The peripheral device according to claim 10, wherein the peripheral device portion has a length of 22 bits, the peripheral device cryptographic value has a length of 22 bits or the peripheral device key has a length of 16 bytes.

15. The peripheral device according to claim 10, comprising a peripheral device derivation unit configured to derive the peripheral device key from a shared secret key shared with at least the central device.

16. The peripheral device according to claim 15, wherein the shared secret key has a length of 64 bytes.

17. The peripheral device according to claim 15, wherein the peripheral device derivation unit is configured to derive the peripheral device key using an MD5 or an SHA function.

18. The peripheral device according to claim 10, wherein the peripheral device is compliant with a Bluetooth Low Energy standard and wherein the advertising address and the resolvable private address are compliant with the Bluetooth Low Energy standard.

19. A communication set-up method for a peripheral device configured for communication with a central device, the method comprising providing a peripheral device key;
providing a peripheral device number;
obtaining a peripheral device cryptographic value from the peripheral device key and the peripheral device number;
assembling an advertising address comprising the peripheral device number;
transmitting the advertising address;
receiving a resolvable private address from the central device;
extracting at least a portion from the resolvable private address to obtain a peripheral device portion;
comparing the peripheral device cryptographic value and the peripheral device portion; and
providing a positive peripheral device indication signal when said comparing provides a match, which indicates that the central device does possess the peripheral device key, and providing a negative peripheral device indication signal when said comparing fails to provide a match, which indicates that the central device does not possess the peripheral device key.

20. A communication set-up method according to claim 19, the method comprising, in the central device,
storing a central device key;
receiving an advertising address from the peripheral device;
extracting a central device portion from the advertising address;
obtaining a central device cryptographic value from the central device key and the central device portion;
assembling a resolvable private address comprising the central device cryptographic value; and
transmitting the resolvable private address.

* * * * *